US011048464B2

(12) United States Patent
Iyer et al.

(10) Patent No.: US 11,048,464 B2
(45) Date of Patent: Jun. 29, 2021

(54) SYNCHRONIZATION AND STREAMING OF WORKSPACE CONTENTS WITH AUDIO FOR COLLABORATIVE VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Hana Schuster Smith, Boulder, CO (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/050,107

(22) Filed: Jul. 31, 2018

(65) Prior Publication Data
US 2020/0042263 A1    Feb. 6, 2020

(51) Int. Cl.
*G06F 3/147* (2006.01)
*G06T 19/00* (2011.01)

(52) U.S. Cl.
CPC ............ *G06F 3/147* (2013.01); *G06T 19/006* (2013.01); *G06T 2210/08* (2013.01); *G06T 2219/024* (2013.01)

(58) Field of Classification Search
CPC ... G06F 3/147; G06T 19/006; G06T 2210/08; G06T 2219/024
See application file for complete search history.

(56) References Cited

U.S. PATENT DOCUMENTS 8,854,282 B1 * 10/2014 Wong ..................... G06F 3/14
345/7
9,178,631 B2 * 11/2015 Cottrell .................. H04H 60/02
(Continued)

FOREIGN PATENT DOCUMENTS

GB          2543320      *  4/2017  ........... H04N 19/146

OTHER PUBLICATIONS

Billinghurst, et al., "Shared space: An augmented reality approach for computer supported collaborative work," Mar. 1998, vol. 3, Issue 1, pp. 25-36, publisher Springer-Verlag, available at https://link.springer.com/article/10.1007/BF01409795.
(Continued)

*Primary Examiner* — Patrick N Edouard
*Assistant Examiner* — Eboni N Giles
(74) *Attorney, Agent, or Firm* — Fogarty LLP

(57) ABSTRACT

Systems and methods for synchronization and streaming of workspace contents with audio for collaborative virtual, augmented, and mixed reality (xR) applications are described. In an embodiment, an Information Handling System (IHS) may include a memory having program instructions stored thereon that, upon execution, cause the IHS to: receive a control operation from a first user wearing a first head-mounted display (HMD) during a collaborative xR session with a second user, where the second user is wearing a second HMD, and is located remotely with respect to the first user; encode the control operation using a first encoding method; receive a workspace operation from the first user; encode the workspace operation using a second encoding method; aggregate the encoded control operation with the encoded workspace operation into one or more packets; and transmit the one or more packets to the second user during the collaborative xR session.

17 Claims, 5 Drawing Sheets

(56) References Cited

U.S. PATENT DOCUMENTS

| | | | |
|---|---|---|---|
| 9,846,972 B2 * | 12/2017 | Montgomerie | G06F 40/169 |
| 9,918,136 B2 * | 3/2018 | Cole | H04N 13/117 |
| 2014/0184475 A1 * | 7/2014 | Tantos | H03M 13/356 |
| | | | 345/8 |
| 2014/0198838 A1 * | 7/2014 | Andrysco | H04N 19/12 |
| | | | 375/240.1 |
| 2017/0282062 A1 * | 10/2017 | Black | A63F 13/323 |
| 2017/0282602 A1 * | 10/2017 | Aoki | B41J 13/0009 |
| 2018/0007422 A1 * | 1/2018 | Castleman | H04N 13/378 |
| 2019/0191230 A1 * | 6/2019 | Li | H04Q 9/00 |
| 2019/0378305 A1 * | 12/2019 | Fitzgerald | H04N 19/167 |
| 2020/0145696 A1 * | 5/2020 | Fitzgerald | H04N 19/146 |
| 2020/0240788 A1 * | 7/2020 | Iyer | G02B 27/0093 |
| 2020/0241632 A1 * | 7/2020 | Iyer | G06T 19/006 |
| 2020/0280739 A1 * | 9/2020 | Fitzgerald | G06T 9/20 |

OTHER PUBLICATIONS

Bruce Bodnyk, "Creo AR: Using PTC Creo for Augmented Reality," Aug. 2, 2017, © 2018 3 HTi, LLC, available at https://3hti.com/creo/creo-ar.

* cited by examiner

SYNCHRONIZATION AND STREAMING OF WORKSPACE CONTENTS WITH AUDIO FOR COLLABORATIVE VIRTUAL, AUGMENTED, AND MIXED REALITY (XR) APPLICATIONS

FIELD

The present disclosure generally relates to Information Handling Systems (IHSs), and, more particularly, to systems and methods for synchronization and streaming of workspace contents with audio for collaborative virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of a head-mounted display (HMD), heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for synchronization and streaming of workspace contents with audio for collaborative virtual, augmented, and mixed reality (xR) applications are described. In an illustrative, non-limiting embodiment, an Information Handling System (IHS) may include: a processor and a memory coupled to the processor, the memory having program instructions stored thereon that, upon execution, cause the IHS to: receive a control operation from a first user wearing a first head-mounted display (HMD) during a collaborative xR session with a second user, where the second user is wearing a second HMD, and is located remotely with respect to the first user; encode the control operation using a first encoding method; receive a workspace operation from the first user; encode the workspace operation using a second encoding method; aggregate the encoded control operation with the encoded workspace operation into one or more packets; and transmit the one or more packets to the second user during the collaborative xR session.

For example, the control operation may include a workspace locking operation. Additionally, or alternatively, the control operation may include a coordinate override operation. The first encoding method may include a differential lossless map encoding. The workspace operation may include an annotation. Additionally, or alternatively, the workspace operation may include a digital object rotation. And the second encoding method may include Lempel-Ziv-Welch (LZW) or Run-Length Encoding (RLE).

The program instructions, upon execution, may cause the IHS to receive synchronization information from a web service, and to add the synchronization information to the one or more packets prior to the transmission. The program instructions, upon execution, may also cause the IHS to: receive audio from the first user during the collaborative xR session; encode the audio using a third encoding method; and aggregate the encoded audio into one or more packets prior to the transmission. The third encoding method may include a lossy audio compression algorithm.

The program instructions, upon execution, may cause the IHS to determine that an uplink bandwidth has decreased below a first threshold, and to reduce an encoding bit rate in response to the determination. Additionally, or alternatively, the program instructions, upon execution, may cause the IHS to determine that the uplink bandwidth has increased above the first threshold, and to increase the encoding bit rate in response to the determination. Additionally, or alternatively, the program instructions, upon execution, may cause the IHS to determine that the uplink bandwidth has decreased below a second threshold smaller than the first threshold, and to reduce a number of encoded control operations aggregated into one or more packets in response to the determination.

In some cases, the second HMD may be coupled to a second IHS, and the second IHS may be configured to: receive the one or more packets; decode at least one of: the control operation or the workspace operation; and render an xR workspace for the second user using the decoded operation. The second IHS may be configured to: receive a video stream from a device co-located with the first user; and render the xR workspace using the video stream.

The second IHS may also be configured determine that a downlink bandwidth has decreased below a threshold, and to reduce a decoding frequency. Additionally, or alternatively, the program instructions, upon execution, may cause the IHS to determine that a downlink bandwidth has decreased below a threshold, and to decode the control operation to the exclusion of the workspace operation.

In another illustrative, non-limiting embodiment, a method may include receiving, by a first user, one or more packets transmitted by a second user, wherein the first user is wearing a first HMD coupled to a first IHS during a collaborative xR session with the second user, and where the second user is wearing a second HMD coupled to a second IHS remotely located with respect to the first user; decoding, from the one or more packets, a control operation, a workspace operation, and audio produced by the second user and encoded in the one or more packets; receiving a local video stream from a device co-located with the second user; and rendering an xR workspace for the first user using the decoded control operation, workspace operation, the audio, and the local video stream.

The method may also include determining that an availability of an IHS resource has decreased below a threshold and, in response to the determination, selectively decoding one or more of: the control operation, workspace operation, the audio, or the local video stream, to the exclusion of one or more of: the control operation, the workspace operation, the audio, or the local video stream.

In yet another illustrative, non-limiting embodiment, a hardware memory device having program instructions stored thereon that, upon execution by a processor, cause the processor to: receive a control operation from a first user wearing a first HMD during a collaborative xR session with a second user, wherein the second user is wearing a second HMD and is located remotely with respect to the first user; encode the control operation using a first encoding method; receive a workspace operation from the first user; encode the workspace operation using a second encoding method; transmit the encoded control operation and workspace operation to the second user during the collaborative xR session in one or more packets; receive another one or more packets transmitted by the second user; decode, from the other one or more packets, another control operation, another workspace operation, and other audio produced by the second user; and render an xR workspace for the first user based on the decoding.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for synchronization and streaming of workspace contents with audio for collaborative virtual, augmented, and mixed reality (xR) applications. These techniques are particularly useful in xR applications that employ HMDs, Heads-Up Displays (HUDs), and eyeglasses—collectively referred to as "HMDs."

Figure 1:
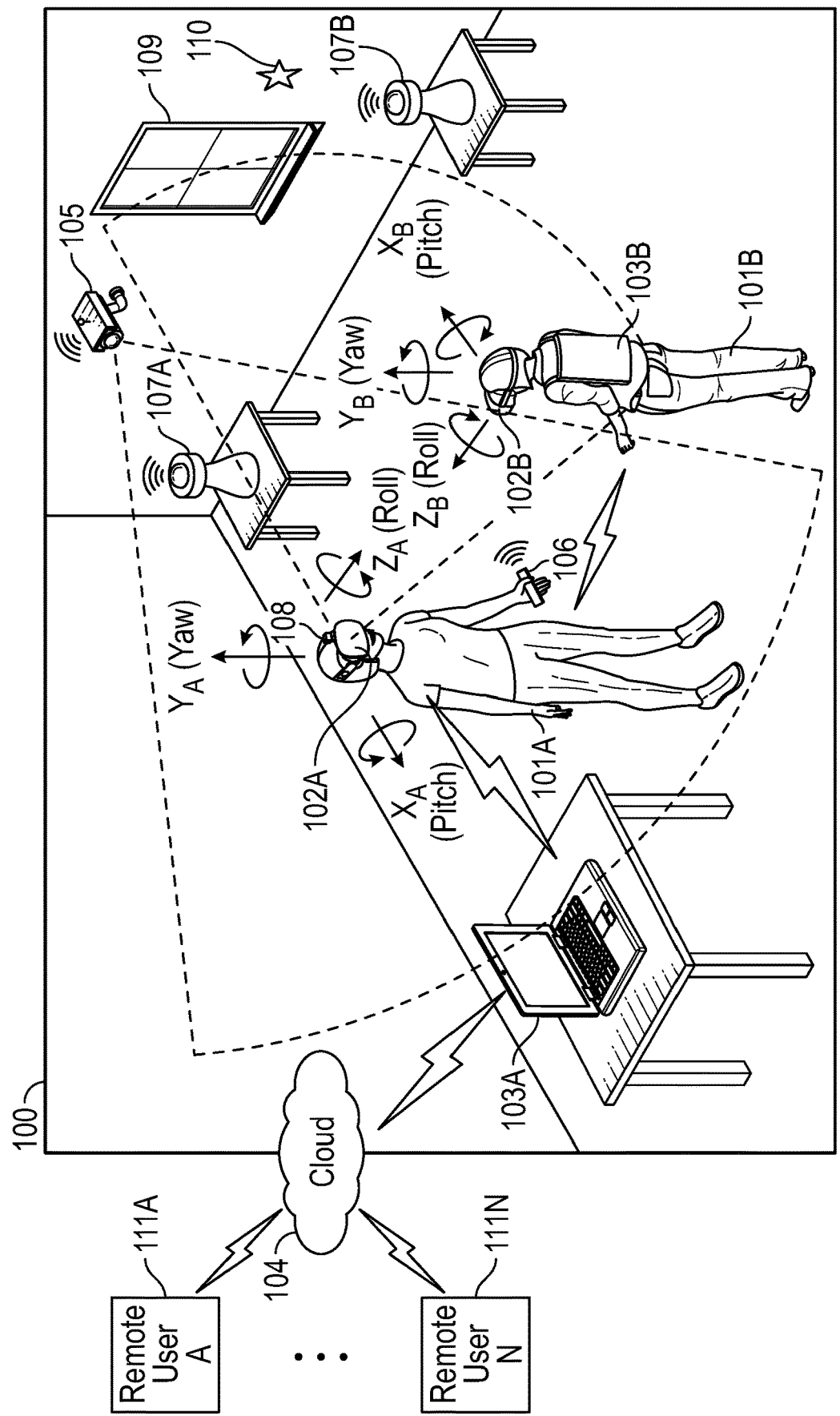
FIG. 1 is a perspective view of an example of a collaborative virtual, augmented, or mixed reality (xR) environment having co-located and remote users, according to some embodiments.

FIG. 1 is a perspective view of an example of physical environment 100 having co-located HMDs 102A and 102B. As illustrated, user 101A wears HMD 102A around their head and over their eyes during execution of an xR application. Similarly, user 101B wears HMD 102B. In this non-limiting example, HMD 102A is tethered to host Information Handling System (IHS) 103A via a wireless connection, and HMD 102B is tethered to host IHS 103B via a wired connection.

In environment 100, the xR application being executed may include a subset of components or objects operated by HMD 102A and another subset of components or objects operated by host IHS 103A; as well as a subset of components or objects operated by HMD 102B and another subset of components or objects operated by host IHS 103B.

Particularly, host IHS 103A may be used to generate digital images to be displayed by HMD 102A. HMD 102A transmits information to host IHS 103A regarding the state of user 101A, such as physical position, pose or head orientation, gaze focus, etc., which in turn enables host IHS 103A to determine which image or frame to display to the user next, and from which perspective. Meanwhile, IHS 103B may generate digital images to be displayed by HMD 102B based on the state of user 101B in a corresponding manner. In this example, host IHS 103B is built into (or otherwise coupled to) a backpack or vest, wearable by user 101B.

As user 101A moves about environment 100, changes in: (i) physical location (e.g., Euclidian or Cartesian coordinates x, y, and z) or translation; and/or (ii) orientation (e.g., pitch, yaw, and roll) or rotation, cause host IHS 103A to effect a corresponding change in the picture or symbols displayed to user 101A via HMD 102A, usually in the form of one or more rendered video frames. Similarly, as user 101B moves, changes in HMD 102B's physical location or translation; and/or HMD 102B's orientation or rotation, cause host IHS 103B to effect corresponding changes in the video frames displayed to user 101B via HMD 102B.

Movement of the user's head and gaze may be detected by HMD 102A and processed by host IHS 103A, for example, to render video frames that maintain visual congruence with the outside world and/or to allow user 101A to look around a consistent virtual reality environment. In some cases, xR application components executed by HMDs 102A-B and IHSs 103A-B may provide a cooperative, at least partially shared, xR environment between users 101A and 101B, such as in the form of a video game or a productivity application (e.g., a virtual meeting).

As used herein, the term "Simultaneous Localization and Mapping" or "SLAM" refers systems and methods that use positional tracking devices to construct a map of an unknown environment where an HMD is located, and that simultaneously identifies where an HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depthsensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMDs 102A-B may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMDs 102A-B triangulate their respective positions and/or states using those elements. Inertial tracking may use data from accelerometers and gyroscopes within HMDs 102A-B to find a velocity and position of HMDs 102A-B relative to some initial point. Acoustic tracking may use ultrasonic sensors to determine the position of HMDs 102A-B by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102A, and infrared markers 107A-B or tag 110 may be placed in known stationary locations. With outside-in tracking, camera 105 may be placed in a stationary location and infrared markers 106 may be placed on HMDs 102A or held by user 101A. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMDs 102A-B may be received by host IHSs 103A-B, which in turn execute the SLAM method of an xR application. In the case of an inside-out SLAM method, for example, an xR application receives the position and orientation information from HMDs 102A-B, determines the position of features extracted from the images captured by camera 108, and corrects the localization of landmarks in space using comparisons and predictions.

An estimator, such as an Extended Kalman filter (EKF) or the like, may be used for handling the propagation component of an inside-out SLAM method. In some cases, a map may be generated as a vector stacking sensors and landmarks states, modeled by a Gaussian variable. The map may be maintained using predictions (e.g., when HMDs 102A-B move) and corrections (e.g., camera 108 observes landmarks in the environment that have been previously mapped). In other cases, a map of environment 100 may be obtained, at least in part, from cloud 104.

As shown in FIG. 1, users 101A and 101B are collocated in environment 100 (e.g., on the same factory floor, meeting room, etc.). In various applications, however, remote users 111A-N (operating their respective HMDs and host IHSs) may be geographically dispersed and in communication with each other over cloud 104.

Figure 2:
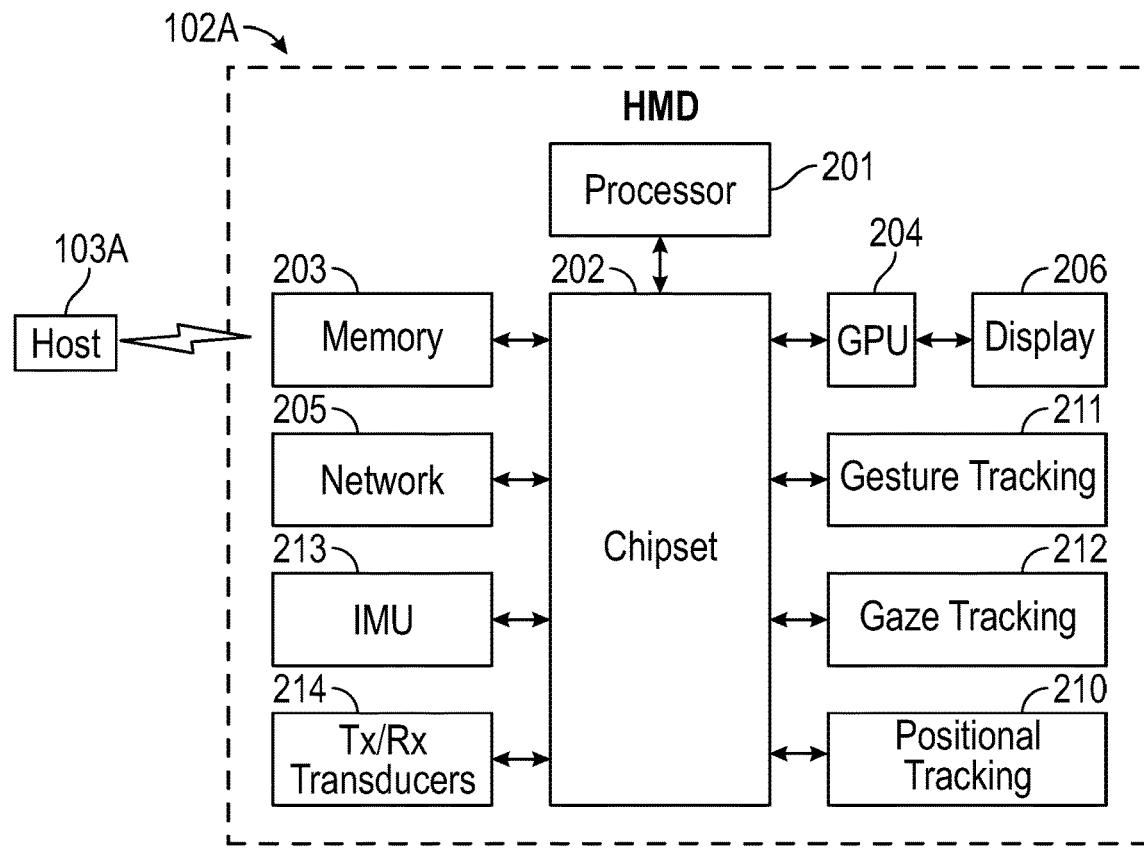
FIG. 2 is a diagram of an example of a head-mounted display (HMD) and a host Information Handling System (IHS), according to some embodiments.

FIG. 2 is a block diagram of an example HMD 102A and host IHS 103A comprising an xR system, according to some embodiments. As depicted, HMD 102A includes components configured to create and/or display an all-immersive virtual environment; and/or to overlay digitally-created content or images on a display, panel, or surface (e.g., an LCD panel, an OLED film, a projection surface, etc.) in place of and/or in addition to the user's natural perception of the real-world.

As shown, HMD 102A includes processor 201. In various embodiments, HMD 102A may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102A includes chipset 202 coupled to processor 201. For example, chipset 202 may utilize a QuickPath Interconnect (QPI) bus to communicate with processor 201. In various embodiments, chipset 202 provides processor 201 with access to a number of resources. For example, chipset 202 may be coupled to network interface 205 to enable communications via wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101A wearing HMD 102A.

Other resources coupled to processor 201 through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine how HMD 102A moves in relation to environment 100. For example, an inside-out tracking system 210 may be configured to implement markerless tracking techniques that use distinctive visual characteristics of the physical environment to identify specific images or shapes which are then usable to calculate HMD 102A's position and orientation.

Gesture tracking system 211 may include one or more cameras or optical sensors that enable user 101 to use their hands for interaction with objects rendered by HMD 102A. For example, gesture tracking system 211 may be configured to implement hand tracking and gesture recognition in a 3D-space via a user-facing 2D camera. In some cases, gesture tracking system 211 may track a selectable number of degrees-of-freedom (DOF) of motion, with depth information, to recognize dynamic gestures (e.g., swipes, clicking, tapping, grab and release, etc.) usable to control or otherwise interact with xR applications executed by HMD 102A.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application.

IMU system 213 may include one or more accelerometers and gyroscopes configured to measure and report a specific force and/or angular rate of the user's head. In some cases, IMU system 212 may be configured to a detect a direction, extent, and/or speed of rotation (e.g., an angular speed) of the user's head in real-time, during execution of an xR application.

Transmit (Tx) and receive (Rx) transducers and/or transceivers 214 may include any number of sensors and components configured to send and receive communications using different physical transport mechanisms. For example, Tx/Rx transceivers 214 may include electromagnetic (e.g., radio-frequency, infrared, etc.) and acoustic (e.g., ultrasonic) transport mechanisms configured to send and receive communications, to and from other HMDs, under control of processor 201. Across different instances of HMDs, components of Tx/Rx transceivers 214 may also vary in number and type of sensors used. These sensors may be mounted on the external portion of frame of HMD 102A, to facilitate direct communications with other HMDs.

In some implementations, HMD 102A may communicate with HMD 102B and/or host IHS 103A via wired or wireless connections (e.g., WiGig, WiFi, etc.). For example, if host IHS 103A has more processing power and/or better battery life than HMD 102A, host IHS 103A may be used to offload some of the processing involved in the creation of the xR experience.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In other embodiments, HMD 102A and/or host IHS 103A may not include all of the components shown in FIG. 2. Additionally, or alternatively, HMD 102A and/or host IHS 103A may include components in addition to those shown in FIG. 2. Additionally, or alternatively, components represented as discrete entities in FIG. 2 may be integrated with other components. In some implementations, all or a portion of the functionality provided by the illustrated components may be provided by components integrated as a System-On-Chip (SOC), or the like.

In various applications, xR HMDs may be employed to facilitate multi-user collaboration sessions or meetings, with two or more local and/or remote participants. For example, a multi-user xR collaboration application may provide an xR workspace, for engineering or design purposes, where Virtual Objects (VOs), groups of VOs, and/or layers of VOs may be manipulated with voice and/or gesture-based Natural User Interfaces (NUIs) that provide multi-layer security, annotations, etc.

As used herein, the term "workspace" or "xR workspace" may refer to a workspace and/or to software comprising one or more xR objects, with support framework (e.g., with menus and toolbars) that provides the ability to manipulate 2D/3D objects or object elements, view, share a file, and collaborate with peers. In some cases, an xR application may provide a workspace that enables layers, so that a virtual object (VO) may be highlighted, hidden, unhidden, etc. (e.g., a car may have an engine layer, a tires layer, a rims layer, door handle layer, etc. and corresponding attributes per layer, including, but not limited to: texture, chemical composition, shadow, reflection properties, etc.).

Additionally, or alternatively, an xR application may provide a workspace that enables interactions of VO (or groups of VOs) in a workspace with real world and viewing VOs, including, but not limited to: hiding/showing layer(s) of VOs, foreground/background occlusion (notion of transparency and ability to highlight interference for VO on VO or VOs on physical object), texture and materials of VOs, cloning a real world object into VO and printing a VO to model of real world prototype, identification of object as VO or real, physics treatments around workspaces involving VOs including display level manipulations (e.g., show raindrops on display when simulating viewing a car VO in rain), etc.

An xR application may also provide a workspace that enables operations for single VO or group of VOs in the workspace, including, but not limited to: rotate, resize, select, deselect (VO or layers within), lock/unlock a VO for edits or security/permissions reasons, grouping of VOs or ungrouping, VO morphing (ability to intelligently resize to recognize dependencies), copy/paste/delete/undo/redo, etc.

Additionally, or alternatively, an xR application may enable operations on entire workspaces, including, but not limited to: minimize/maximize a workspace, minimize all workspaces, minimize/hide a VO within a workspace, rename workspace, change order of workspace placeholders, copy VO from one workspace to another or copy an entire workspace to another, create a blank workspace, etc.

In some cases, an xR application may enable communication and collaboration of workspaces, including, but not limited to: saving a workspace to a file when it involves multiple operations, multiple VO, etc.; being able to do differences across workspaces (as a cumulative) versions of same file, optimized streaming/viewing of workspace for purposes of collaboration and live feedback/editing across local and remote participants, annotating/commenting on workspaces, tagging assets such as location, etc. to a workspace, etc.; includes user privileges, such as read/write privileges (full access), view-only privileges (limits operations and ability to open all layers/edits/details), annotation access, etc.

As such, an xR workspace may be generally subject to: (i) control operations; and (ii) workspace operations. Control operations relate to commands made by a user presently in charge of a collaboration session (e.g., a moderator or host) such as, for example: locking/unlocking a workspace, changing user permissions, performing a coordinate override operation, or the like. Meanwhile, workspace operations may include adding or editing an annotation, performing VO manipulation (e.g., rotation, translation, size or color changes, etc.), or the like; whether those operations disturb an ongoing collaboration session ("active operations") or not ("passive operations").

With respect to coordinate override, in an environment where multiple participants of a collaborative session are handling or viewing a shared xR workspace, it may be important for a given user to share his perspective of that workspace. For example, during a training or education session, an instructor may occasionally need to share his or her point of view of an xR model. But it would not be practical or expedient for the instructor to have all of the students move next to him or her, in order to see what he or she sees.

Accordingly, instructor 101A wearing HMD 103A may have his or her student 101B's HMD 102B enter a "See-What-I-See" (SWIS) mode of operation, with coordinate override turned on. In that mode, HMD 102B receives location coordinates and/or gaze vector from HMD 102A, and host IHS 103B uses that information to render video frames for display by HMD 102B, but from HMD 102A's perspective.

In some cases, this results in the video frames rendered by host IHS 103A and presented to user 101A by HMD 102A matching the video frames independently rendered by host IHS 103B and presented to user 101B by HMD 102B. HMD 102B may later toggle back to a natural xR view that matches student 101B's unique visual perspective, for example, by turning the coordinate override feature off.

In some implementations, host IHS 103B may execute a runtime engine, such as UNITY, UNREAL, AUTODESK, etc., which render an xR model displayed by HMD 102B from user 101B's unique point-of-view based upon the user's coordinate location, pose, and/or gaze relative to the model.

For instance, HMD 102A may be located at coordinates Xa, Ya, and Za, it may have a pose $Yaw_a$, $Pitch_a$, and $Roll_a$, and it may have a gaze vector Ga. HMD 102B is located at coordinates Xb, Yb, and Zb, has a pose $Yaw_b$, $Pitch_b$, and $Roll_b$, and has a gaze vector Gb. A runtime engine in host IHS 103A uses Xa, Ya, Za, $Yaw_a$, $Pitch_a$, $Roll_a$, and Ga detected by HMD 102A to render one or more video frames to be displayed by HMD 102A, and another runtime engine in host IHS 103B uses Xb, Yb, Zb, $Yaw_b$, $Pitch_b$, $Roll_b$, and Gb detected by HMD 102B to independently render video frames displayed by HMD 102B.

When HMD 102B is required to render the view of HMD 102A (e.g., user 101B wants to see what user 101A sees), however, HMD 102A and/or IHS 103A communicates one or more of: Xa, Ya, Za, $Yaw_a$, $Pitch_a$, $Roll_a$, and/or Ga to HMD 102B and/or IHS 103B. For example, HMD 102A may transmit a data payload to HMD 102B that includes authentication information and session ID, an HMD model ID, intrinsic parameters (e.g., projective mapping from world coordinates to pixel coordinates), and extrinsic parameters (e.g., parameters that define the camera center and a camera's heading in world coordinates).

The firmware of HMD 102B overrides Xb, Yb, Zb, $Yaw_b$, $Pitch_b$, $Roll_b$, and Gb and substitutes that information with Xa, Ya, Za, $Yaw_a$, $Pitch_a$, $Roll_a$, and Ga in its communication to the runtime in its own host IHS 103B. This instantly reorients the view displayed by HMD 102B to align it with the visual perspective of user 101A (as also displayed by HMD 102A).

By way of illustration, an xR collaboration application may be used during design or factory floor review process in the following scenario: John has created v0.9 of a component design, namely, xR workspace "A1_0.9." John emails the xR workspace file to Susan and Jack, and sets up an AR meeting to review the design of component for their feedback. Both colleagues are remotely located with respect to John.

When the meeting begins, John starts an AR Audio-Video feed share with his colleagues, while Susan and Jack wear their HMDs at their respective desks. John also starts a recording session of the meeting, with audio channels having each participant input and video being described below as collaborative workspace "CW." This feed authenticates and lets Susan and Jack view the feed session. The feed shows A1_0.9 as a collaborative workspace "CW" that, based on permissions John has set for session, Susan and Jack can individually edit, view, etc. The video part of the feed is in a streaming format shared to all participants; similarly, the audio portion may have its own streaming format.

During the meeting, Susan wants to illustrate a point of feedback. She takes control of CW, rotates/scales and illustrates her feedback. She further annotates her feedback once acknowledged by John and Jack into CW, either as audio annotation or voice commands converted to post-it virtual note. Susan gives control back to John once she is done.

Jack has an idea, but does not want to share it yet because he wants to visualize it himself first. He creates a local copy of CW, performs some manipulations, and then announces to the rest of the group that he has an idea. John and Susan want to hear about it. Jack takes control of CW. Jack does a SWIS view of his copy of CW, and illustrates his point. Everyone approves his idea, so he saves his copy of CW as an annotation with his voice annotation converted to text (metadata annotation). Alternatively, Jack can perform a SWIS incorporation from his copy into CW. Jack releases control of CW back to John. Alternatively, Jack can send his copy of CW as an xR workspace file to Jack after the meeting.

At end of the meeting, John decides to go incorporate the feedback and generate v0.95. Once he is done, John initiates the factory review phase with colleagues that are local and remote with respect to the factory floor. Remote colleagues also receive a video part of the feed being generated showing workspace against the real-world physical factory floor.

John starts a video recording for later review, which records local and remote participants as separate individual "channels" and the xR workspace overlaid on physical space of factory as a video feed. This recording is also streamed to remote participants. Local and remote participants can manipulate the xR workspace as previously described, where one participant can take control, illustrate their point and hand back control.

All participants annotate their feedback and also have audio based comments recorded on channel. Workspace manipulation may use transparency and/or occlusion areas to show where VOs may impinge upon existing factory equipment when placed in constrained factory space. The interference is part of workspace feed streamed/recorded. John finishes the session, goes back to design and unit test phase to incorporate feedback from participants and fix the interfering areas of his new component.

In the foregoing scenario, local users may be connected to the collaborative multi-user sessions via the same Local Area Network (LAN), and remote users may be connected via Wide Area Networks (WANs), with varying bandwidth, latency and overall quality of service (QoS). Nonetheless, using systems and methods described herein, remote users are able to participate in a collaborative multi-user session in the same manner as local users do, and can perform many of the actions that a collocated user can do, such as making annotations, making edits on the fly after locking a workspace or VO for editing, etc. For example, in the scenario described above, a remote user may see the xR workspace designed in AR with a VO representing the designed component, but also overlaid on the actual factory floor with its real-world constraints of space, degrees of motion, etc.

In various embodiments, systems and methods described herein may provide encoding and decoding xR workspace changes during a collaborative xR session, along with real-world content/context, multiple channels of audio, and state information (e.g., locked by user X, etc.). Such operations may be performed in a synchronized way, with any xR HMD user attending the session, despite heterogeneous connectivity.

Figure 3:
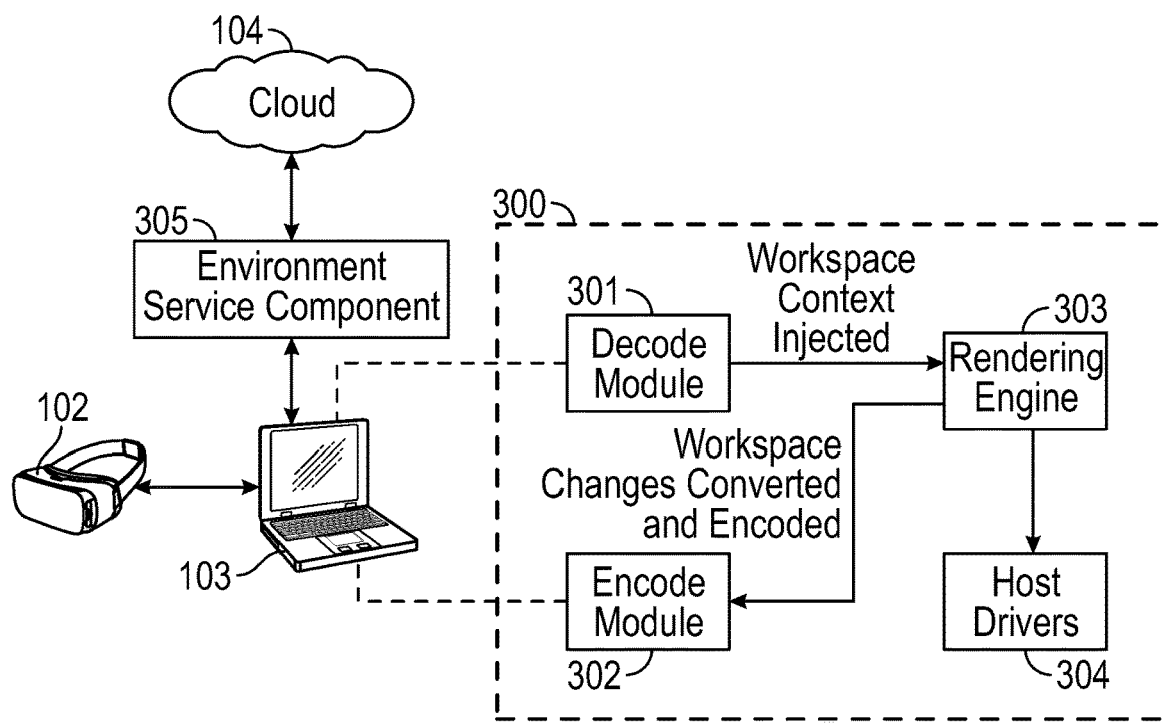
FIG. 3 is a diagram of an example of a system for synchronization and streaming of workspace contents with audio for collaborative xR applications, according to some embodiments.

FIG. 3 is a diagram of an example of system 300 for synchronization and streaming of workspace contents with audio for collaborative xR applications. In some embodiments, system 300 may include electronic circuits and/or program instructions stored in a hardware memory device that, upon execution by a processor of host IHS 103, provide components of a collaborative xR application.

In system 300, decode module or component 301 is configured to receive workspace context (e.g., from other users or participants), and to inject that context into rendering engine 303. Rendering engine 303 sends video frame information to host drivers 304, which produce visual aspects of a collaborative xR session.

Meanwhile, encode module or component 302 converts and encodes workspace changes, as produced by rendering engine 301, for transmission to other participants of the collaborative xR session. For example, workspace changes may take place due to gestures or commands issued by the user and recognized using HMD 102, changes in the user's gaze direction, etc.

In this example, environment service component 305 may also provide a service that broadcasts the environment's context via cloud 104, such as POV cameras either running as fixed assets (e.g., camera 105 in a factory floor environment) or from other users' HMDs (e.g., camera 108). To this end, environment service component 305 may use any suitable video encoding method such as, for example, H.264 or the like.

Figure 4:
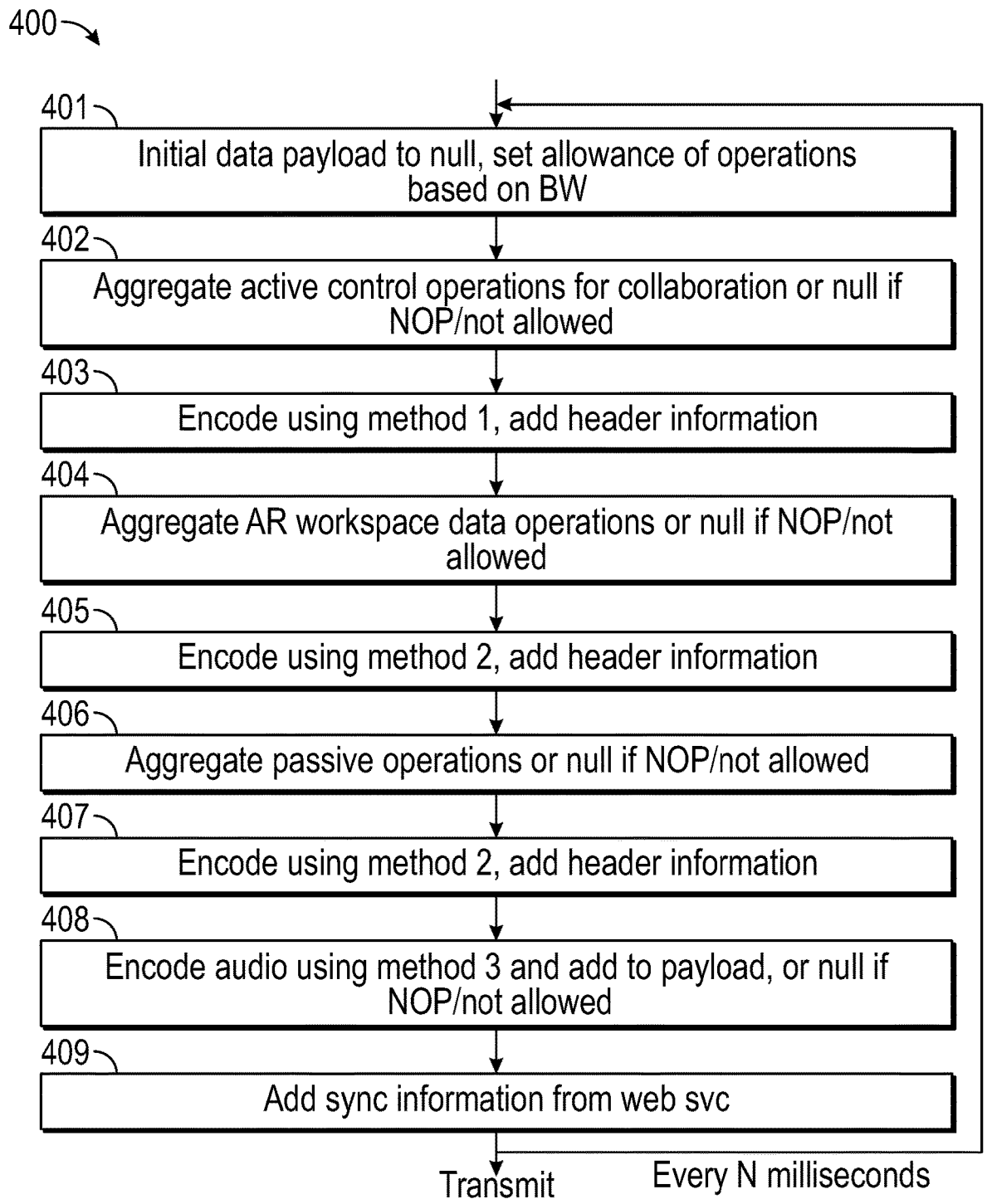
FIG. 4 is a flowchart of an example of a method for encoding information in a collaborative xR application, according to some embodiments.

FIG. 4 is a flowchart of an example of method 400 for encoding information in a collaborative xR application. In some embodiments, method 400 may be performed by encode module or component 302 (in FIG. 3), for example, when: (i) the user has control over the workspace by locking it first, changing permissions, performing a SWIS across multiple collocated users cameras or factory cameras to see their POV on factory fit, etc. ("Control Operations"); (ii) the user is performing an annotation or active VO manipulation ("Active Workspace Operation"); (iii) the user is passively performing an operation such as annotation, without disturbing the collaborative session actively ("Passive Operations"); (iv) the user is involved in audio communications; or (v) under control of timing telemetry embedded in a streaming communication, such as timestamp based on a web service that provides it ("Sync Information").

Also, during execution of method 400, encode module or component 302 may employ any M methods of encoding, for example, depending upon the type of data being encoded, including, but not limited to: (i) differential lossless map (look up table/hash table and indices/actions) encoding of Control Operations; (ii) differential lossless data encoding such as Lempel-Ziv-Welch (LZW) or Run-Length Encoding (RLE) of Data Operations and Passive Operations; and (iii) audio encoding for audio data (e.g.: AAC-LC, G.711, etc.)

At block 401, method 400 creates one or more packets for streaming transmission, sets an initial data payload to a NULL value, and determines an allowance of operations based upon current bandwidth and/or host IHS resource utilization. At block 402, method 400 aggregates Active Control Operations or sets it to NULL if there is no operation (NOP), or if the operations are not allowed (e.g., the user does not have permissions for invoking SWIS). At block 403, method 400 encodes the Active Control Operations using encoding method (i) above, and adds header information to the one or more packets identifying or associated with those operations.

At block 404, method 400 aggregates Active Workspace Operations or sets it to NULL if there is no operation (NOP), or if the operations are not allowed (e.g., the user does not have permissions for manipulating an active VO). At block 405, method 400 encodes the Active Workspace Operations using encoding method (ii) above, and adds header information to the one or more packets identifying or associated with those operations.

At block 406, method 400 aggregates Passive Operations or sets it to NULL if there is no operation (NOP), or if the operations are not allowed (e.g., the user does not have permissions for making private annotations). At block 407, method 400 encodes the Passive Operations, still using encoding method (ii) above, and adds header information to the one or more packets identifying or associated with those operations.

At block 408, method 400 encodes audio using method (iii) and adds it to the payload, or sets it to NULL if there is no audio (e.g., the user's microphone is muted). At block 409, method 400 adds synchronization information to the payload and/or header, which may be obtained from any suitable timing or synchronization service (e.g., a web service), and transmits the one or more packets to other local or remote user(s) participating in the same collaborative xR session. In some cases, method 400 may be repeated every N milliseconds to achieve a streaming transmission, which may be dynamically adjustable based upon bandwidth and/or host IHS resource utilization.

Figure 5:
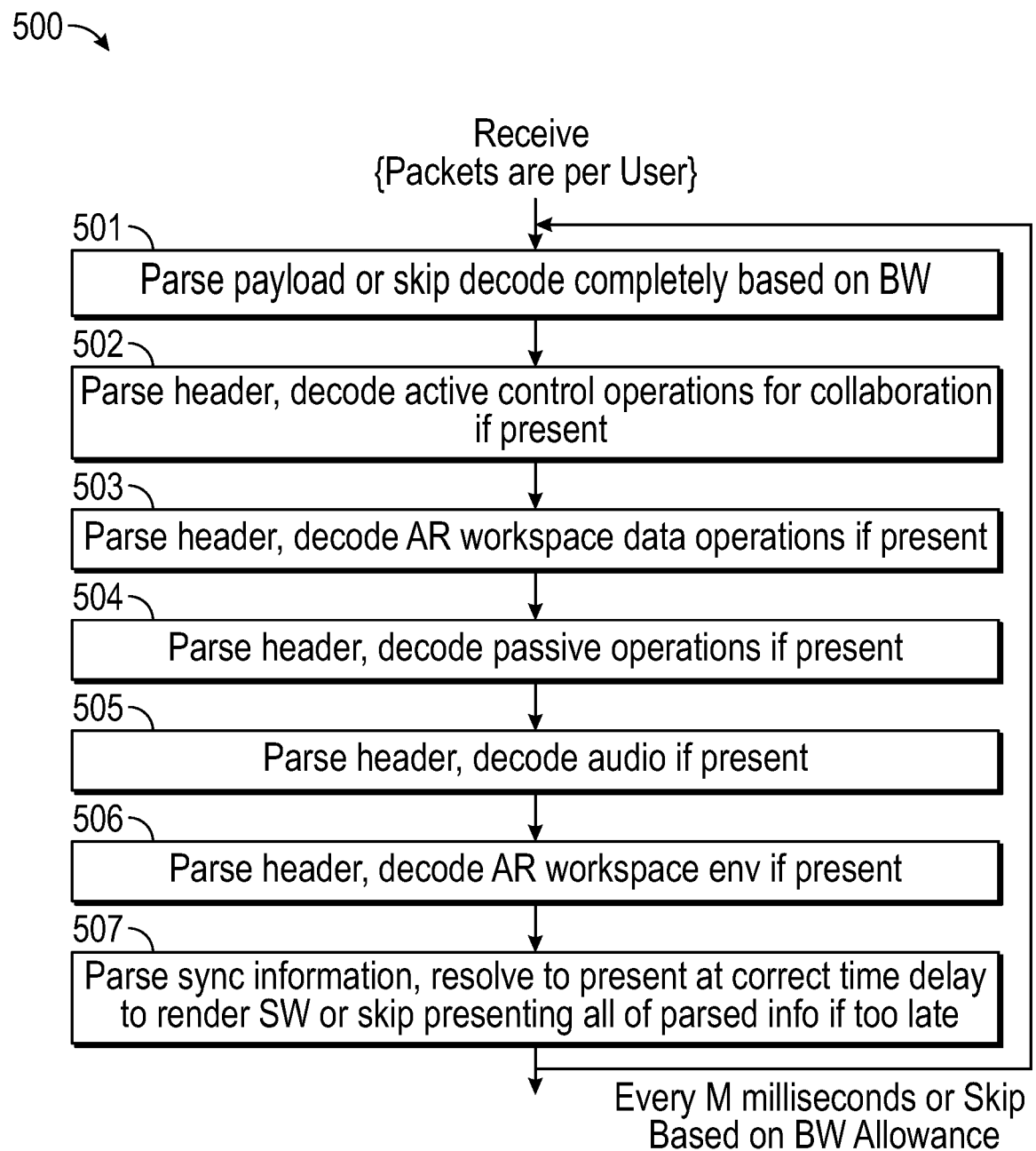
FIG. 5 is a flowchart of an example of a method for decoding information in a collaborative xR application, according to some embodiments.

FIG. 5 is a flowchart of an example of method 500 for decoding information in a collaborative xR application. In some embodiments, method 500 may be performed by decode module or component 301 (in FIG. 3) for the duration of a collaboration session, to decode: (i) active user "Control Operations for Collaboration" (when another user is illustrating, talking, etc.); (ii) active user "Workspace Data Operations" (when another user has control and is manipulating the collaborative workspace); (iii) multiple camera feeds of real-world environment that the workspace is placed in (in AR use-cases); (iv) audio feeds from all users, per channel ("Audio"); and (v) passive operations from all users ("Passive Operations"). Moreover, decode module or component 301 may use decoding methods corresponding to the encoding methods (one of the M methods).

At block 501, method 500 receives one or more packets (e.g., per session participant) and parses the payload (or skips decoding entirely, based upon available bandwidth). At block 502, method 500 parses a packet header and decodes Active Control Operations, if present. At block 503, method 500 decodes Workspace Data Operations, if present. At block 504, method 500 decodes Passive Operations, if present. At block 505, method 500 decodes audio, if present. At block 506, method 500 decodes video provided by environment service component 305, if present. Then, at block 507, method 500 parses synchronization information, resolves the incoming operations and/or other data with proper time delays and/or adjustments.

Decode module or component 301 may pass the decoded information to rendering engine 303, which may skip presenting at least a portion of the parsed operations if the time delay is greater than a threshold value, or all parsed operations if downlink bandwidth or other host IHS resource is constrained beyond a predetermined amount. In some cases, method 500 may be repeated every M milliseconds, dynamically adjusted based upon bandwidth and/or host IHS resource utilization.

Figure 6A:
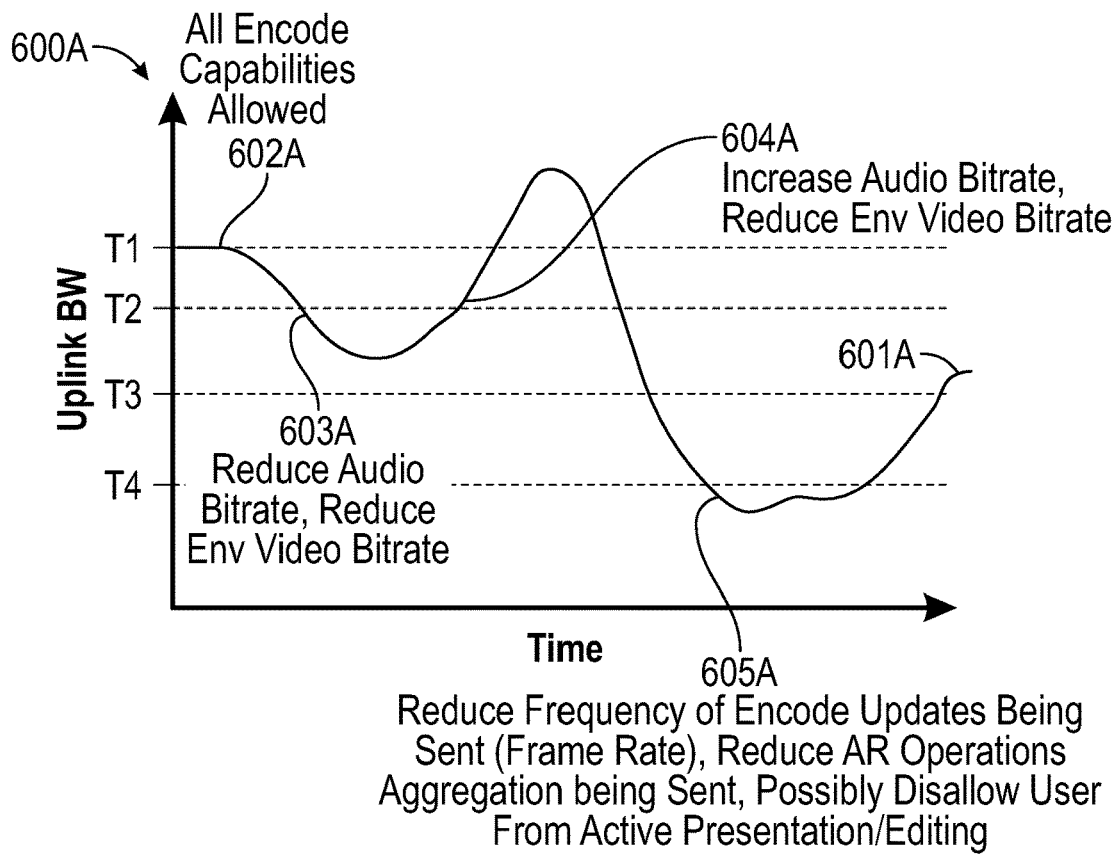
FIGS. 6A and 6B are graphs illustrating example use-cases of dynamic encoding and decoding of information in a collaborative xR application, according to some embodiments.
Figure 6B:
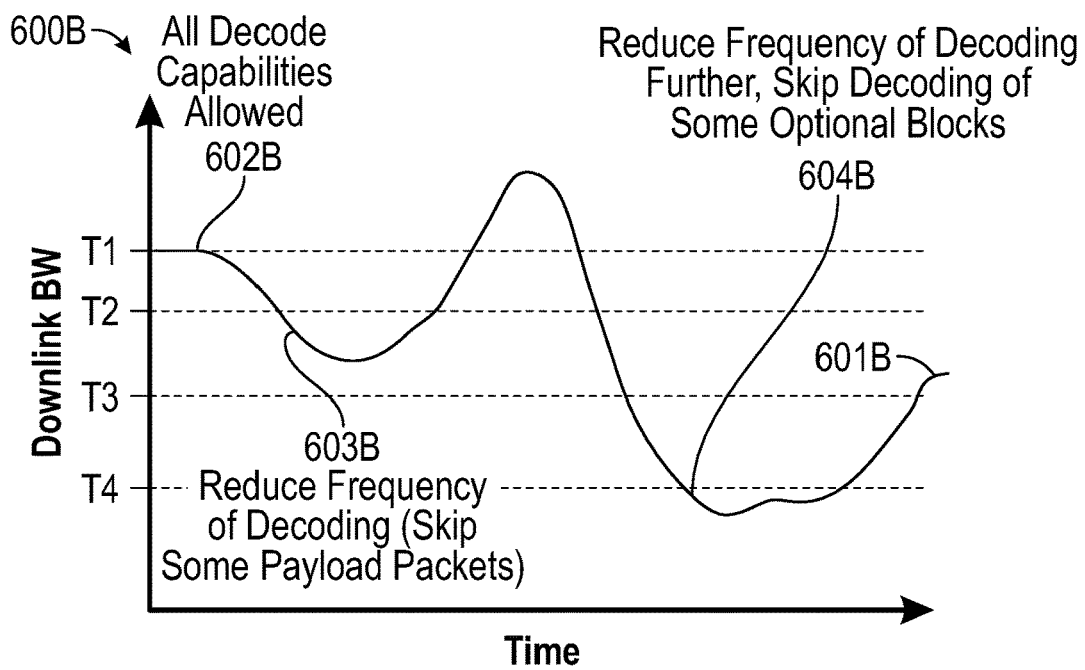

In various implementations, data on encode/decode paths may be transmitted and/or processed in a way that scales with respect to bandwidth and quality of service across different HMDs. In that regard, FIGS. 6A and 6B are graphs illustrating example use-cases of dynamic encoding and decoding of information in a collaborative xR application. Although these examples use scaling based on uplink/downlink bandwidth, it should be noted that the encoding and decoding of methods 400 and 500 may also be scaled according to any host IHS resource utilization or availability (e.g., processor, memory, etc.).

In FIG. 6A, graph 600A shows curve 601A illustrating a situation where, up until time 602A, the uplink bandwidth is at or above a first threshold value (T1), and in response all encoding capabilities are allowed (e.g., blocks 403, 405, 407, and 408 of method 400). At time 603A, curve 601A drops below a second threshold value (T2), and in response there is a reduction in audio encoding bitrate and/or in the environment's video encoding bitrate (e.g., by block 305).

At block 604A, however, curve 601A rises above T2, and in response there is an increase in the audio encoding bitrate and/or in the environment's video encoding bitrate. Then, at block 605A, there is a significant drop in uplink bandwidth availability below threshold T4, and in response the frequency of encode updates being sent (frame rate) and/or the number of aggregated operations is reduced. In some cases, the user may be disallowed from active presentation or editing until a higher bandwidth availability threshold is reached.

In FIG. 6B, graph 600B shows curve 601B illustrating another use-case where, up until time 602B, the downlink bandwidth is at or above a first threshold value (T1), and in response all decoding capabilities are allowed (e.g., blocks 502-506 of method 500). At time 603B, curve 601B drops below a second threshold value (T2), and in response there is a reduction in the frequency of decoding (e.g., by skipping payload packets). Then, at block 604B, there is a significant drop in uplink bandwidth availability below threshold T4, and in response the frequency of decoding is further reduced (e.g., by skipping additional payload packets).

In sum, the systems and methods described herein may provide real-time interactive xR/AR workspace synchronized collaborative transmit/receive sessions, across remote and collocated users, where real-world information (such as factory floor) also is important, and where different users may have heterogeneous connection conditions. These systems and methods may employ otherwise conventional rendering engines on all endpoints, which are further configured to capture control and data events or operations to transmit-and-encode or decode-and-inject. As such, these systems and methods address heterogeneous connectivity for collaboration participants (e.g., different latency, bandwidth, etc.) for different types of data being shared in different ways.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
determine an allowance of control operations and workspace operations to be transmitted in support of a collaborative virtual, augmented, or mixed reality (xR) session comprising a first user wearing a first head-mounted display (HMD) and a second user wearing a second HMD;
receive a control operation from the first user, wherein the control operation indicates a command by the first user relative to the xR session;
when the control operation is within the allowance, encode the control operation using a first encoding method, wherein the first encoding method is selected based on a bandwidth available for communicating xR session data with the second HMD;

receive a workspace operation from the first user;

when the workspace operation is within the allowance, encode the workspace operation using a second encoding method, wherein the second encoding method is selected based on a bandwidth available for communicating xR session data with the second HMD;

aggregate into one or more packets: any control operation within the allowance and any workspace operation within the allowance; and transmit the one or more packets to the second HMD during the collaborative xR session, wherein the second HMD is coupled to a second IHS, and wherein the second IHS is configured to:

determine an allowance of control operations and workspace operations to be decoded in support of the collaborative xR session, wherein the second IHS is configured determine that a downlink bandwidth has decreased below a threshold, and to adjust the decoding allowance to decode fewer received workspace operations and control operations;

receive the one or more packets;

when control operations received in the one or more packets are within the decoding allowance, decode received control operations, when the second IHS determines that the downlink bandwidth has decreased below the threshold, control operation are decoded to the exclusion of the workspace operations while the downlink bandwidth remains below the threshold;

when workspace operations received in the one or more packets are within the decoding allowance, decode received workspace operations; and render an xR workspace for the second user using the decoded workspace operations and the decoded control operations.

2. The IHS of claim 1, wherein the control operation comprises a workspace locking operation.

3. The IHS of claim 1, wherein the control operation comprises a coordinate override operation.

4. The IHS of claim 1, wherein the first encoding method comprises a differential lossless map encoding.

5. The IHS of claim 1, wherein the workspace operation comprises an annotation.

6. The IHS of claim 1, wherein the workspace operation comprises a digital object rotation.

7. The IHS of claim 1, wherein the determining of the allowance further comprises determining an allowance of audio to be transmitted in support of the collaborative xR session.

8. The IHS of claim 1, wherein the program instructions, upon execution, further cause the IHS to:

receive synchronization information from a web service; and add the synchronization information to the one or more packets prior to the transmission.

9. The IHS of claim 7, wherein the program instructions, upon execution, further cause the IHS to:

receive audio from the first user during the collaborative xR session;

when the audio is within the allowance, encode the audio using a third encoding method; and aggregate the encoded audio into one or more packets prior to the transmission.

10. The IHS of claim 9, wherein the third encoding method comprises a lossy audio compression algorithm.

11. The IHS of claim 1, wherein the program instructions, upon execution, further cause the IHS to determine that an uplink bandwidth has decreased below a first threshold, and to adjust the allowance of workspace operations and control operations to be transmitted in support of the collaborative xR session.

12. The IHS of claim 11, wherein the program instructions, upon execution, further cause the IHS to reduce the encoding bit rate of the workspace operations in response to the decreased uplink bandwidth.

13. The IHS of claim 11, wherein the adjustment of the allowance results in reduced transmission of control operations in the one or more packets and limits an ability of the first user to conduct control operations in the collaborative xR session.

14. The IHS of claim 1, wherein the second IHS is further configured to:

receive a video stream from a device co-located with the first user; and render the xR workspace using the video stream.

15. A method, comprising:

determining a resource utilization of a first IHS (Information Handling System) above a threshold;

determining an allowance of control operations and workspace operations to be transmitted in support of a collaborative virtual, augmented, or mixed reality (xR) session comprising a first user wearing a first head-mounted display (HMD) coupled to the first IHS and a second user wearing a second HMD, wherein the allowance is determined based on a downlink bandwidth of the first IHS;

receiving, by the first user wearing the first HMD, one or more packets transmitted by the second user wearing the second HMD, wherein the one or packets comprise a control operation, a workspace operation, and audio encoded in the one or more packets by the second IHS;

determine an allowance of control operations and workspace operations to be decoded in support of the collaborative xR session, wherein the first IHS is configured determine that the downlink bandwidth has decreased below a threshold, and to adjust the decoding allowance to decode fewer received workspace operations and control operations;

when the workspace operation is within the allowance, decoding the workspace operation;

when the control operation is within the allowance, decoding the control operation, wherein, when the first IHS determines that the downlink bandwidth has decreased below the threshold, control operation are decoded to the exclusion of the workspace operations while the downlink bandwidth remains below the threshold;

when the audio is within the allowance, decoding the audio; and rendering an xR workspace for the first user using any decoded control operation, any decoded workspace operation and any decoded audio.

16. The method of claim 15, the determined allowance limits an ability of the second user to conduct workspace operations in the xR session.

17. A hardware memory device having program instructions stored thereon that, upon execution by a processor, cause the processor to:

determine an allowance of control operations and workspace operations to be transmitted in support of a collaborative virtual, augmented, or mixed reality (xR) session comprising a first user wearing a first head-mounted display (HMD) and a second user wearing a second HMD;

receive a control operation from the first user, wherein the control operation indicates a command by the first user relative to the xR session;

when the control operation is within the allowance, encode the control operation using a first encoding method, wherein the first encoding method is selected based on a bandwidth available for communicating xR session data with the second HMD;

receive a workspace operation from the first user;

when the workspace operation is within the allowance, encode the workspace operation using a second encoding method, wherein the second encoding method is selected based on a bandwidth available for communicating xR session data with the second HMD;

aggregate into one or more packets: any control operation within the allowance or a control operation placeholder when the control operation is not within the allowance and any workspace operation within the allowance or a workspace operation placeholder when the workspace operation is not within the allowance;

transmit the encoded control operation and workspace operation to the second user during the collaborative xR session in one or more packet;

determine an allowance of control operations and workspace operations to be decoded by the second HMD in support of the collaborative xR session, wherein the second IHS is configured determine that a downlink bandwidth has decreased below a threshold, and to adjust the decoding allowance to decode fewer received workspace operations and control operations;

receive the one or more packets;

when control operations received in the one or more packets are within the decoding allowance, decode received control operations, when the second IHS determines that the downlink bandwidth has decreased below the threshold, control operation are decoded to the exclusion of the workspace operations while the downlink bandwidth remains below the threshold;

when workspace operations received in the one or more packets are within the decoding allowance, decode received workspace operations; and render an xR workspace for the second user using the decoded workspace operations and the decoded control operations.

* * * * *